Figure 1:
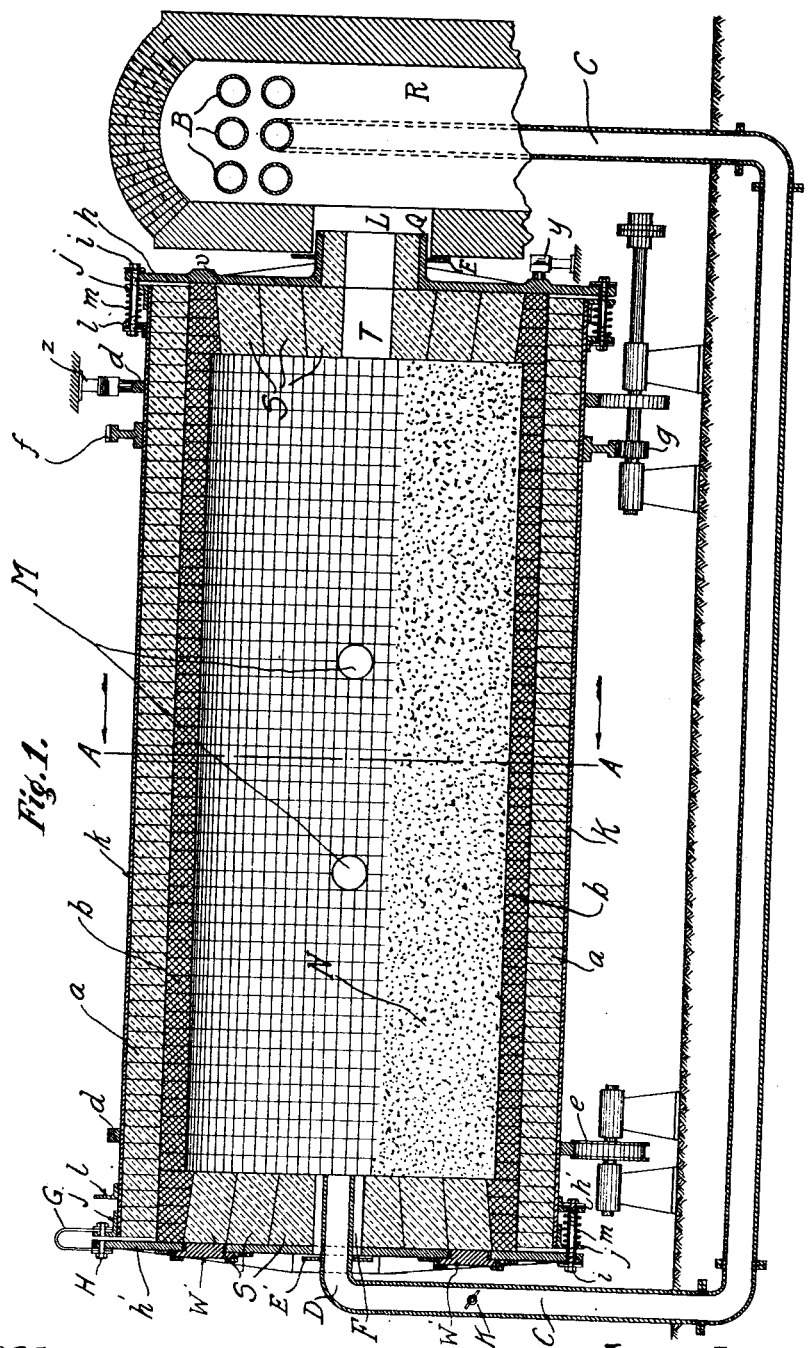

A. L. J. QUENEAU.
ROASTING OF COMPOUNDS OR ORES CONTAINING ZINC.
APPLICATION FILED JULY 19, 1911.

1,132,684.

Patented Mar. 23, 1915.
2 SHEETS—SHEET 1.

Witnesses:
Thos. J. Maguire

Inventor:
A. L. J. Queneau
by Venner, Davis & Goldsborough
Attorneys

A. L. J. QUENEAU.
ROASTING OF COMPOUNDS OR ORES CONTAINING ZINC.
APPLICATION FILED JULY 19, 1911.

1,132,684.

Patented Mar. 23, 1915.
2 SHEETS—SHEET 2.

UNITED STATES PATENT OFFICE.

AUGUSTIN LEON JEAN QUENEAU, OF PHILADELPHIA, PENNSYLVANIA.

ROASTING OF COMPOUNDS OR ORES CONTAINING ZINC.

1,132,684.

Specification of Letters Patent. Patented Mar. 23, 1915.

Application filed July 19, 1911. Serial No. 639,400.

*To all whom it may concern:*

Be it known that I, AUGUSTIN L. J. QUENEAU, a citizen of the Republic of France, residing at Philadelphia, county of Philadelphia, State of Pennsylvania, have invented certain new and useful Improvements in Roasting of Compounds or Ores Containing Zinc; and I do hereby declare the following to be a full, clear, and exact description of the invention, such as will enable others skilled in the art to which it appertains to make and use the same.

My invention relates to the roasting of compounds or ores containing zinc and more especially to the roasting of zinc blende.

It relates further to apparatus suitable for the carrying out of the roasting process.

Heretofore, insofar as I am aware, it has not been found feasible, on an industrial scale, to obtain a dead roast of zinc blende by mere direct combustion of its sulfur content, because of the difficulty of attaining the high temperature that is required at the end of the roast for the dissociation of the zinc sulfate which is always formed. During the final stage referred to, but a small percentage of sulfur remains in the ore, and of this small percentage a large proportion has already been oxidized and locked up as zinc sulfate.

To dissociate the zinc sulfate it has heretofore been the universal custom to obtain the final high temperature required for that purpose by the combustion of carbonaceous fuel, the operation being conducted either in the customary kilns or in muffle furnaces. In order to operate these kilns and muffle furnaces to advantage, however, it is necessary to thoroughly rabble the ore so as to bring its particles into intimate contact with the air, since the oxidation of the sulfur content is attained only by immediate surface action. For the economical employment of the rabbling furnace, moreover, a high percentage of sulfur oxides is required in the resultant gases, inasmuch as these gases are usually conveyed to a sulfuric acid plant for their recovery as sulfuric acid. These requirements of the muffle furnaces have resulted in constructions which are extremely complicated and costly, it being necessary, particularly, to protect the rabbles within the furnace from the effects of the high temperatures prevailing therein which sometimes rise to 1100° C. In fact, it is usually found necessary to entirely remove the rabbles from time to time, in order to permit them to cool in the outer air, and the frequent opening and closing of the furnace for the passage of the rabbles results in the admission of a large volume of excess air, which unduly cools the furnace, slows down the rate of oxidation and dilutes the sulfur gases beyond the required minimum.

My present invention is designed to provide a method and apparatus for obtaining any desired temperature for the roasting of zinc blende, without the combustion of any carbonaceous fuel, and to constantly stir the ore without the aid of rabbles. The required additional heat units necessary for the purpose are generated *in situ* in immediate contact with the zinc blende under treatment, and the air admitted to the furnace for oxidizing the sulfur of the ore is put under absolute control, only such a quantity of air being admitted as is required for the oxidization of the sulfur and for the proper composition of the issuing gases appropriate to the most economical operation of the sulfuric acid plant which they supply. The entire operation is, therefore, conducted under conditions giving high thermal efficiency, and the rabbling of the ore is obtained without the expenditure of hand labor, as will hereinafter more fully appear.

Figure 2:
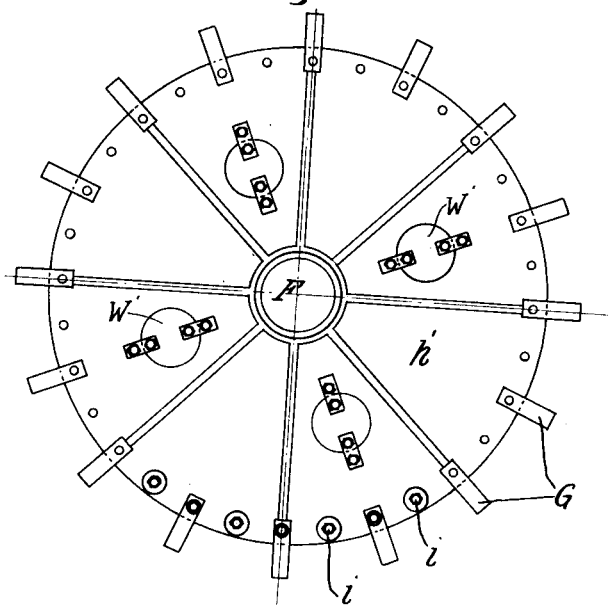
Figure 3:
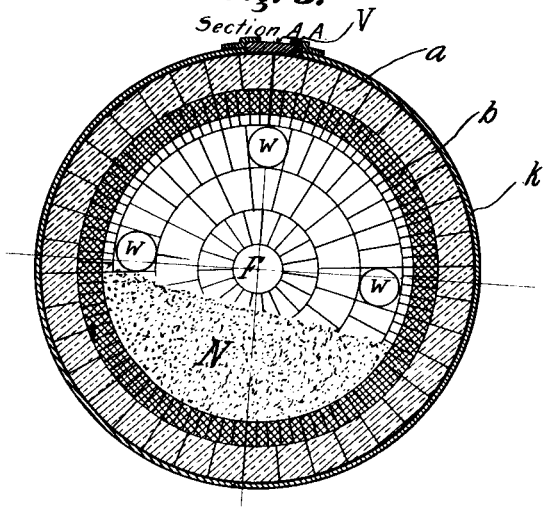

In the accompanying drawings, Figure 1 represents, in longitudinal section, one form of an electric roasting furnace and its adjuncts, suitable for the practice of my invention; Fig. 2 represents an end view of the furnace, with certain of the parts removed; Fig. 3 represents a vertical cross section thereof, taken on the plane indicated by the line A, A of Fig. 1.

Similar letters of reference indicate similar parts throughout the several views.

Referring to the drawings, the roasting furnace, as shown, consists of a cylindrical shell $k$ preferably of boiler plate, to which are secured tires $d$, supported upon rollers $e$, rotary motion being given to the furnace by means of a ring gear $f$, meshing with the pinion $g$ which constitutes an element of a variable speed mechanism of any suitable kind.

The furnace is preferably horizontal and is provided at one end with a plate $h$, having a central cylindrical hub Q, provided with a collar E. The hub Q extends partly within the flue opening L of a dust chamber R, the collar E giving a fairly close fit between the hub and the wall of the dust chamber, so as to reduce the air leak at this point to a minimum. The plate H is held to the shell K through the intermediacy of insulated bolts $i$ which pass through the angle $j$, riveted to the shell, and through the slidable ring $l$, springs $m$ being interposed between the ring $l$ and the angle $j$. These springs $m$ encompass the bolts $i$ thereby providing means for giving to the plate $h$ a relative freedom of motion which may be regulated by means of the long threads upon the bolts. The plate $h$ is further provided with a raised annular projection $v$, adapted to make contact with a brush $y$ connected to one of the leads of the external circuit. The opposite end of the furnace is provided with a plate $h'$ connected to the shell $k$ in a manner similar to the plate $h$. While the plate $h$ is carefully insulated electrically from the shell $k$, as described, the plate $h'$ is maintained in complete electric connection with the shell $k$ by means of the soft copper U-shaped small plates G, which alternate in position with the bolts $i$, as is more fully indicated in Fig. 2. The return lead of the external circuit (when a direct current or a monophase alternating current is employed) may contact to the shell $k$ by means of a brush $z$ making contact with one of the tires $d$.

The plate $h'$ has a central opening F, through which enters a pipe C for the introduction of the oxidizing gas, preferably preheated air, to the inside of the furnace. The pipe C is provided with a damper K for regulating the amount of air supplied to the furnace, and it has a collar E' lined, if desired, with asbestos board and making a close fit with the plate $h'$.

The shell $k$ of the furnace is provided with an outer lining of bricks, preferably silica bricks $a$, and an inner electrically conducting lining $b$ which extends throughout the entire length of the shell, so as to abut against the inner surfaces of the end plates $h$ and $h'$. The two end plates are held in elastic but strong mechanical and electrical contact with the conducting lining.

The conducting lining is preferably a lining of magnesite bricks which have been rendered conducting by a small amount of graphite entering into their composition. The bricks are laid in a mortar consisting of some oleaginous or tarry materials with which is incorporated a mixture of 25% by weight of graphite and 75% by weight of finely ground magnesia. Instead of the conducting magnesite bricks, however, I may use the ordinary so-called graphite bricks, which are made of about 50% by weight of flake graphite and 50% by weight of suitable clay, these bricks being similarly laid in the oleaginous or tarry mortar above referred to. The end plates are preferably lined with magnesia blocks S. The furnace may be charged and discharged in any suitable manner, as, for instance, through openings M adapted to be closed by means of suitable refractory blocks backed by closing metallic covers, not shown. In the dust chamber R is located a system of preheating pipes B through which the air is admitted into the pipe C, these preheating pipes being adapted to be raised to a high temperature by the waste heat from the escaping gases from the furnace.

If desired, the interior of the furnace may be lined with conducting blocks of unequal length, in such manner that some of them would project either irregularly or preferably in horizontal or shelf-like series, in order to promote and better expose the blende to the action of the oxidizing gases, as is primarily done in other rotary roasting furnaces.

In carrying out my invention, I may conveniently supply the electric current thereto as a direct current or as a monophase alternating current, as hereinbefore indicated, although, if desired, I may make use of polyphase currents supplied to the furnace in any suitable manner, as, for instance, in the manner described in my application for Letters Patent of the United States, Ser. No. 536,791. Or, a number of furnaces of the type herein disclosed may be applied by connecting them up in a polyphase circuit in such manner that one furnace shall be placed in each leg of the circuit.

The interior lining of the furnace is first raised to a roasting temperature which may be effected either by the application of a gas and air injector or "torch" of sufficient heating power, or by the immediate application of the electric current, or by both expedients, simultaneously or successively. The preliminary heating when the lining is new has the effect of burning out the graphite present on the exposed surfaces of the conducting blocks, leaving exposed to the contact of the charge of blende afterward supplied, a surface that carries no carbonaceous material. The zinc blende, which has preferably been crushed to the usual size, i. e., between one and two millimeters is then charged into the furnace and the furnace is given a slow rotation, amounting preferably to from 10 to 60 revolutions per hour. In the meantime, air is admitted to the furnace through the pipe C, in regulated amount, and, as the charge is tumbled by the rotation of the furnace, its surfaces come into constantly changing contact both with the passing stream of air and the electrically heated walls of the furnace, the electric current being maintained under conditions to produce the necessary temperature for the efficient progress of the roasting operation.

The charge is, consequently, heated from below by direct contact with the electrically heated lining, and from above by radiation from those portions of the lining that are out of contact with it, and, of course, the temperature is still further augmented by the combustion of the sulfur by the oxygen of the passing air current.

The amount of air entering the furnace is easily regulated by means of the butterfly valve or damper K, and care is taken, by means of the close fitting collar E', to prevent air passing into the furnace around the pipe D and, in like manner, by means of the collar E, to prevent air from passing into the dust chamber R around the hub Q. In this manner, the furnace is protected against the admission of currents of air beyond those that have been predetermined as appropriate to the operation, and diluting and cooling air is excluded from the roast gases.

It will be evident that a large portion of the heat carried away by the roast gases will be utilized in preheating the air admitted to the roasting chamber, thereby not only recuperating the heat, but bringing the air to the temperature suitable for the proper carrying on of the roasting operation, this being highly desirable not only from the point of view of economy, but also because the chemical activity of the air is thereby enhanced and the speed of the chemical reaction between the blende and the oxygen of the air is promoted. It will also be evident that the degree of agitation or tumbling of the charge may be increased or diminished, at will, without in any way affecting the amount of air passing through the furnace, thereby eliminating the factor of excess air admission during rabbling.

During the final stage of the operation, I prefer to considerably reduce the amount of air admitted, or even to cut off the supply of air altogether, so as to very rapidly increase the temperature with the purpose of breaking up by dissociation the zinc sulfate still present in the ore, thereby obtaining a very complete desulfurization of the final product. In one of the end walls of the furnace are arranged rabble holes, which are normally closed during the operation of the furnace, but which may be uncovered so as to permit the insertion of a suitable tool for assisting in the discharge of the material through the openings M when the operation of desulfurization of the blende is completed.

In certain prior application for Letters Patent of the United States, and more especially in an application filed by me under date of June 8th, 1911, Ser. No. 631952, I have shown and described methods and apparatus for the extraction of zinc from zinc ores and similar reducible compounds of zinc. In these prior applications, the process being essentially a reducing process is carried on in a closed chamber, great care being taken to prevent the admission of air even in extremely minute quantity, since its presence would be absolutely fatal to zinc reduction and particularly to the condensation of zinc to the commercial form of spelter. Furthermore, in these prior applications the generation of the heat employed for the reduction is described as taking place either wholly or in part through the intermediacy of a suitable molten resistor, and as an integral part of the apparatus, a condenser is employed wherein the reduced zinc contained in the gases is condensed, this condensation being an inseparable part of the process and the most important one of the whole series of operations. In the present invention, on the other hand, the metallurgical operation is in its essential character, the very opposite of the operation carried on in the apparatus of my former applications, hereinbefore referred to. That is to say, whereas, in my former applications the operation consisted in the reduction of the oxidized form of zinc obtained from a roasting or oxidizing furnace, the operation in the present instance consists in the oxidizing or roasting, by means of heated air (i. e., air in a super-active chemical form) of ore such as zinc blend, for the purpose of bringing the ore into such a condition that it may subsequently be converted into spelter. So also, whereas in the practice of the inventions covered by my former applications, absolutely no air must be admitted, the opposite is the case in the present instance, wherein in order to obtain the roasting effect, air must be admitted in very large quantities, and, in fact, in quantities not less than three times by weight that of the zinc blende, that is to say, at least three tons of air are passed through the furnace for every ton of 60% blende to be roasted. So also, it is not possible, in accordance with the present invention, to make use of a molten resistor, as this would coat the particles of blende in such manner as to prevent the oxygen of the air current from coming in contact with the unaltered sulfid and, the roasting operation must be conducted with extreme care so as to avoid any sintering of the blende, inasmuch as the sintering would interfere with the complete desulferization that is essential to good zinc extraction in the subsequent reduction process. It is also essential, in accordance with the present invention, that any tendency to reduction in the roasting furnace should be substantially suppressed for the reason that the existence of reducing conditions at temperatures reached in the final stages of the roasting operation would be sufficient to reduce some of the zinc compounds of the charge, with the liberation of zinc vapor, which would be swept out with the roast gases and be lost with them, thereby resulting in a dead loss to the operation.

It will be clear, therefore, that both in its essential character and in the details of the operation, the present invention is substantially different from that set forth in my prior applications for reducing zinc from its oxids and condensing it to spelter.

What I claim is:—

1. The method of dead-roasting zinc blende, which consists in introducing the blende into a roasting chamber, maintaining an oxidizing roasting atmosphere therein while keeping the charge in agitation, heating the lining of the roasting chamber by an electric current and thereby maintaining the temperature of the charge at the roasting point for zinc blende and establishing neutral conditions between the lining and the charge during the roasting operation; substantially as described.

2. The method of dead-roasting zinc blende, which consists in introducing the blende into a roasting chamber, maintaining an oxidizing roasting atmosphere therein while keeping the charge in agitation, heating the lining of the roasting chamber by an electric current and thereby maintaining the temperature of the charge at the roasting point for zinc blende, and establishing neutral conditions between the lining and the charge during the roasting operation, the temperature prevailing in the charge being raised to the intended maximum during the final stage of the operation; substantially as described.

3. An electric roasting furnace for zinc blende, said furnace having an oxidizing roasting chamber provided with a refractory resistor made up of material which at its face of contact with the charge is substantially non-reducing, means for introducing the zinc blende into the chamber, means for maintaining the temperature of the charge at the roasting point for zinc blende by passing an electric current through the resistor of non-reducible material, and means for passing through the chamber a stream of oxidizing gas in such volume as to maintain an oxidizing roasting atmosphere therein while keeping the charge in agitation; substantially as described.

4. An electric furnace for roasting zinc blende, said furnace having an oxidizing roasting chamber provided with a lining made up of magnesite bricks carrying such a percentage of graphite as will make it a conductor of the first order but insufficient to exercise any substantial reducing effect upon the charge, means for introducing the zinc blende into the chamber, means for maintaining the temperature of the charge at the roasting point for zinc blende by passing an electric current through the refractory resistor lining, and means for sending through the chamber a stream of oxidizing gas in such volume as to maintain an oxidizing roasting atmosphere therein while keeping the charge in agitation; substantially as described.

5. An electric furnace for roasting zinc blende, said furnace having an oxidizing roasting chamber provided with a refractory resistor made up substantially of non reducing material at its face of contact with the charge; means for introducing into the chamber the zinc blende, means for maintaining the temperature of the charge at the roasting point by passing an electric current through the resistor, and means for sending through the chamber a stream of oxidizing gas in such volume as to maintain an oxidizing roasting atmosphere therein, while keeping the charge in agitation; substantially as described.

6. An electric furnace for roasting zinc blende, said furnace having an oxidizing roasting chamber provided with a refractory resistor made up of magnesite bricks carrying such a percentage of graphite as will make it a conductor of the first order, but insufficient to exercise any substantial reducing effect upon the charge; means for introducing into the chamber the zinc blende, means for maintaining the temperature of the charge at the roasting point by passing an electric current through the resistor and means for sending through the chamber a stream of oxidizing gas in such a volume as to maintain an oxidizing roasting atmosphere therein, while keeping the charge in agitation, substantially as described.

In testimony whereof I affix my signature, in presence of two witnesses.

AUGUSTIN LEON JEAN QUENEAU.

Witnesses:
WM. JAY TURNER,
A. E. MAHAN.